United States Patent
Wolford et al.

(10) Patent No.: US 6,854,320 B2
(45) Date of Patent: Feb. 15, 2005

(54) METHOD AND APPARATUS FOR STORAGE TANK LEAK DETECTION

(76) Inventors: Jimmy Wolford, P.O. Box 1578, Kilgore, TX (US) 75663; Bernie Wolford, 2525 Old Farm Rd. #2426, Houston, TX (US) 77063; Clark Lockerd, 18202 Shiredak Dr., Houston, TX (US) 77084; Ricky Slaughter, P.O. Box 1578, Kilgore, TX (US) 75663

(*) Notice: Subject to any disclaimer, the term of this patent is extended or adjusted under 35 U.S.C. 154(b) by 0 days.

(21) Appl. No.: 10/614,748

(22) Filed: Jul. 7, 2003

(65) Prior Publication Data

US 2005/0005683 A1 Jan. 13, 2005

(51) Int. Cl.[7] ............................. G01M 3/02; G01M 3/26
(52) U.S. Cl. ........................................... 73/49.2; 73/40
(58) Field of Search ..................................... 73/40, 49.2

(56) References Cited

U.S. PATENT DOCUMENTS

| | | | |
|---|---|---|---|
| 4,862,733 A | * | 9/1989 | Hyfantis et al. ............. 73/49.2 |
| 5,201,212 A | * | 4/1993 | Williams ................. 73/40.5 R |

* cited by examiner

Primary Examiner—Daniel S. Larkin
(74) Attorney, Agent, or Firm—David G. Henry (57) ABSTRACT

An intrinsically safe, precise, and cost effective storage tank leak detection system. Embodiments include a highly precise quartz crystal type pressure transducer, secured in a vacuum and held at a constant temperature. Said transducer is used in combination with data correction and regression techniques to yield a storage tank leak detection system with an extremely low leak detection threshold. The storage tank leak detection system is thought to be most useful for detecting very small leaks in very large storage tanks, most likely above ground storage tanks.

22 Claims, 8 Drawing Sheets

METHOD AND APPARATUS FOR STORAGE TANK LEAK DETECTION

BACKGROUND OF THE INVENTION

1. Field of the Invention

The present invention is directed towards a method and apparatus for providing a safe, precise, and cost-effective storage tank leak detection system; and more particularly, to a method and apparatus wherein the containment integrity of a storage tank is determined by mass measurements of the stored product.

2. Background Information

Storage tanks play a vital role in today's economy. The economy, on a global scale, depends on the proper function of these tanks as they are prevalent in several industries and virtually every geographical region in the world. In light of the vital role these storage tanks play, the integrity of the tanks is placed at a premium. That is, storage tank owners are willing to invest huge sums of money in both the maintenance and inspection of such tanks.

These tanks come in all shapes and sizes, are found both below and above ground, and are used to store a wide-range of materials. Storage tank capacities range from hundreds to millions of gallons and are used to store a staggering assortment of products; these storage tanks are commonly used to store hazardous material.

As one could imagine, there is a wide range of problems associated with maintaining storage tank integrity, particularly with above ground storage tanks. Given the enormous dimensions of above ground tanks, the corrosive products contained within the tanks, the incredible mass of the stored product, and the extreme weather conditions the tanks are subjected to; it is plain to see that above ground storage tank leaks are an all-to-common problem. Using the United States Environmental Protection Agency leak detection threshold criteria of 0.05 gallons per hour in a 10,000-gallon underground tank, that threshold would equate to a 15 gallon per hour detection level in an 80,000 barrel above ground tank. Given the limited number of systems capable of meeting the EPA's underground storage tank leak detection threshold and the added difficulties associated with above ground tanks, the difficulty in protecting against and detecting leaks is easily seen.

However, the recognized difficulty in preventing storage tank leaks does not mitigate the duties or liabilities imposed on responsible parties. Tremendous environmental and economic consequences and the threat of litigation and clean up costs associated with storage tank leaks force responsible parties to invest large sums of money in the maintenance and inspection of the tanks. Tank inspections are costly with respect to the amount of money spent, the danger presented to the inspectors and the environment, and production downtime. In fact, these inspections often remove a tank from service for more than one month. The threat of liability also forces responsible parties to spend money unnecessarily for the maintenance of these tanks. Moreover, liability does not end with litigation and clean-up costs.

Currently, responsible parties are, in some countries, being incarcerated as a direct result of storage tanks leaks. These leaks have contaminated surrounding ground water, some of which serves as drinking water for local residents. As such, the facilities associated with such incidents have been shutdown until compliance with emissions regulations can be established beyond reasonable doubt. Such proof, in turn, is dependent on proof of reliable and sufficiently accurate detection systems and methods for proving such compliance. Each day the shuttered facilities remain inoperative adds to an already tremendous amount of money lost.

Prior to the present invention (to be described in detail hereafter), there are simply no known systems or methods by which the leak detection requirements can be met. Presently available leak detection systems lack detection thresholds low enough to detect leaks down to permissible upper leakage limits for above ground storage tanks.

Clearly, for the reasons set forth above, there is a dire and immediate need for the ability to determine, with far more precision than presently possible through use of presently available systems and methods, the presence and degree of leakage from above ground storage tanks, at least to the extent of proving compliance with applicable storage tank leakage regulations or statutes.

Comparison with Known Technologies in the Field

Storage tank leak detection systems are known in the art; however, these products are fraught with problems. The present systems are imprecise, or provide erroneous data for any or all of reasons including: the consistency of the soil acting as the tank's foundation, the temperature stratification of the in-tank product, extraneous noise sources, thermal expansion of the tank's contents, water table level, previous soil contamination, and/or tank shell dynamics.

Further, some detection devices can only be used when the storage tank is empty, and no known system or method ensures a comprehensive inspection of the tank. The most common form of such a system is "vacuum box testing;" however, this system is intended only for weld joints and is not usually applied to the entire tank bottom. Magnetic flux floor scanning is also used, but is not effective at examining the area of the floor surface close to the surface walls or where there are physical obstructions. Ultrasonic detection is used, but this is only effective for small areas of the surface. Gas detection is also used, but the types of materials stored in the tank can obstruct this method.

Other common leak detection systems employ a level sensor. However, even large volume changes produce only small level changes, as the cross-sectional area of the liquid surface in these tanks is very large. This, combined with differential expansion and temperature change of the stored liquid and its vapor, make this type of detection system inconsistent and very nearly worthless.

Finally, mass measurement detection systems are known in the art. However, the presently available systems and associated methods are not capable of the precision, which is indicated above as crucial at the present time (and which, as described below, is afforded by the systems and methods of the present invention). Present mass measurement leak detection systems in the art are limited by tank shell variations resulting from temperature effects on tank shell plating. As such, known mass measurement detection systems are only sensitive enough to be used in smaller tanks, typically underground storage tanks. However, as will be seen in the specification to follow, the present invention overcomes tank shell variations and other shortcomings of presently known technology in this field through data collection and data correction apparatus, techniques and interpretation.

In light of the severe consequences of failing to detect significant storage tank leaks, presently not detectable through use of known systems or methods, there is a compelling need for a system and method by which one can detect very small leaks even in very large tanks, ideally in a safe and cost effective manner.

It would well serve those who are responsible for maintaining storage tank integrity to provide a safe, precise, and cost-effective detection system that does not depend on independent variables such as fluid temperature, fluid stratification, or tank stabilization, and may be used in an efficient manner thereby preserving industrial and environmental resources.

SUMMARY OF INVENTION

In view of the foregoing, it is an object of the present invention to provide a storage tank leak detection apparatus with a very low detection threshold that may be used in an efficient manner thereby preserving industrial and environmental resources.

It is another object of the present invention to provide an apparatus for safe storage tank leak detection.

It is another object of the present invention to provide an apparatus for precise storage tank leak detection.

It is another object of the present invention to provide an apparatus for cost-effective storage tank leak detection.

It is another object of the present invention to provide an apparatus for non-intrusive storage tank leak detection.

It is another object of the present invention to provide an apparatus for storage tank leak detection where the contents of the storage tank do not have to be removed.

It is another object of the present invention to provide an apparatus for storage tank leak detection where no chemical additives are involved.

It is another object of the present invention to provide an apparatus for immediate storage tank leak detection.

It is another object of the present invention to provide an apparatus for conclusive storage tank leak detection.

It is another object of the present invention to provide an apparatus for quantitative storage tank leak detection.

It is another object of the present invention to provide an apparatus for storage tank leak detection that does not depend on fluid temperature changes.

It is another object of the present invention to provide an apparatus for storage tank leak detection that does not depend on fluid stratification.

It is another object of the present invention to provide an apparatus for storage tank leak detection that does not require tank stabilization time.

It is another object of the present invention to provide an apparatus for storage tank leak detection that requires only minimal tank preparation.

It is another object of the present invention to provide an apparatus for storage tank leak detection that has been evaluated by an EPA-recognized, independent third party laboratory.

It is another object of the present invention to provide a method with a very low detection threshold that may be used in an efficient manner thereby preserving industrial and environmental resources.

It is another object of the present invention to provide a method for safe storage tank leak detection.

It is another object of the present invention to provide a method for precise storage tank leak detection.

It is another object of the present invention to provide a method for cost-effective storage tank leak detection.

It is another object of the present invention to provide a method for non-intrusive storage tank leak detection.

It is another object of the present invention to provide an apparatus for storage tank leak detection where the contents of the storage tank do not have to be removed.

It is another object of the present invention to provide an apparatus for storage tank leak detection where no chemical additives are involved.

It is another object of the present invention to provide a method for immediate storage tank leak detection.

It is another object of the present invention to provide a method for conclusive storage tank leak detection.

It is another object of the present invention to provide a method for quantitative storage tank leak detection.

It is another object of the present invention to provide a method for storage tank leak detection that does not depend on fluid temperature changes.

It is another object of the present invention to provide a method for storage tank leak detection that does not depend on fluid stratification.

It is another object of the present invention to provide a method for storage tank leak detection that does not require tank stabilization time.

It is another object of the present invention to provide a method for storage tank leak detection that requires only minimal tank preparation.

It is yet another object of the present invention to provide a method for storage tank leak detection that has been evaluated by an EPA-recognized, independent third party laboratory.

The present invention provides a safe, extremely precise, and cost-effective solution to the problems mentioned above. Test results associated with the present invention provide an accurate determination of containment integrity, and in the event of leakage, a precise volumetric leak rate. The present invention is not restricted by fluid type, fluid temperature, fluid level, or tank size.

Distinguished from products known in the art, the present invention provides an intrinsically safe detection system. The leak detection system of the present invention uses a sufficiently low wattage (as established in the National Electric Code) so that the components of the system may be placed within the class I area of the tank. In fact, the present invention provides for leak detection system components to be placed within the storage tank. As will be described in the specification to follow, placement of leak detection components in the tank used in combination with system control techniques and data correction software, provide for precision not possible with products known in the art.

Further, no physical inspection of the tanks is required for practice of the present system. As such, there is no need to drain, clean, or enter the tank. With no need for physical inspection, neither inspectors nor the environment are exposed to the contents of the tank. With no need to drain the storage tank, practice of the present invention does not produce hazardous by-products associated with the draining/cleaning process, and danger from transport and storage of the drained product is avoided. Finally, the systems and methods of the present invention do not require chemical additives to be mixed with the tank contents. As such, incidental spills and leaks are avoided altogether.

Practice of the present invention is cost effective. Tank structure or the foundation and surrounding soil are not disturbed, as such; set-up time and capital investment costs are minimized. The present invention is non-intrusive and does not require manual inspection of the tank. Therefore, operation of the tank is not hindered, so there is no production downtime. There is no cost related to the handling, transport, disposal, or storage of removed hazardous material. Finally, testing can be accomplished simultaneously to further reduce the total time involved and rapidly identify problem areas.

The determinative feature of mass measurement leak detection systems is the sensitivity of the apparatus. That is, the lower the leak detection threshold level of a device, the more effective it will be at detecting leaks. The present invention, by employing a combination of techniques and components not known in the art, provides a leak detection threshold that is much lower than any known device. Most importantly, the system of the present invention provides for placing mass measuring components within the actual storage tank, thereby eliminating extraneous noise associated with bubbler units required by other products in the art. The system secures the mass measuring components within a vacuum and holds the mass measurement component's temperature constant during the entire measurement process. Further, the system corrects errors in the data attributed to storage tank shell dynamics and inherent imprecision in the mass measurement devices. This data correction process will be discussed in detail in the specification to follow.

As mentioned, tank shell variations limit the effectiveness of presently known mass measurement detection systems. The systems and methods of the present invention overcome tank shell variations through data collection and data correction techniques. First, data is collected through use of a quartz crystal type pressure transducer (the specifications and use of this transducer will be explained in more detail in the Detailed Description of the Preferred Embodiment). An intrinsically safe remote terminal unit, connected to the pressure transducer, records pressure data over a period of time (preferably one to five nights). The atmospheric temperature and barometric pressure are recorded and precisely analyzed to calculate any changes in the mass of the fluid within the tank. This data is regressed to give a line slope that is converted to a leak rate, usually in gallons per hour.

Data generated by the transducer is collected on a 24-hour basis. Only data containing a sufficiently low amount of extraneous noise is analyzed. Such data is usually obtained at nighttime and during fair weather conditions. Also, data correction software accounts for the coefficient of expansion for any given storage tank. This correction eliminates the effect of the sun's radiant energy on the area of the surface tank, which may adversely affect the mass measurement of the stored product. The nighttime data is corrected for atmospheric conditions and variations in the tank shell. These measurements and corrections allow the system to repeatedly achieve the stated accuracy in real world conditions on a routine basis.

For even greater precision, the leak detection system of the present invention provides for an independent barometric measuring means to constantly record the barometric pressure during the data collection process. This independent barometric pressure measuring means used in combination with data correction software, corrects any zero drift associated with the individual pressure transducer. That is, this system corrects for the inherent error present in any transducer when that transducer deviates from its initial calibration.

Practice of the apparatus involves securing a combination of precise mass measurement components, including a highly precise quartz crystal type pressure transducer, in a vacuum-sealed canister. This canister is then lowered to the bottom surface of a storage tank. A differential reference is placed just above a liquid surface. The pressure, measured at the tank floor ("tank bottom pressure") and atmospheric pressure measured just above the liquid surface, is recorded by the above-referenced micro sensitive differential pressure transducer, recorded on a real time basis and post processed using a data analysis routine to accurately calculate any changes in the mass of fluid contained within the tank to determine if there is a loss. The present system, using the specified transducer, and when used in the manner and with the data interpretation described herein, is capable of detecting above ground storage tank leaks at a threshold of less than 0.9 gallons per hour with a probability of detection of 95% in a 100,000 barrel tank—far more accurate than possible with any presently available quantitative leak detection system. This, quantitatively, amounts to detecting pressure differentials equivalent to less than $\frac{1}{10,000}$th inch of water column pressure, a tolerance level necessary to achieve such detection thresholds.

The method and apparatus of the present invention provides a safe and effective way to detect very small leaks in very large tanks. Particularly, the present invention provides a tremendous improvement in accuracy and leak detection threshold, allowing its users to achieve greater results than presently thought possible.

Thus, in satisfaction of the above objects, an embodiment of the present invention provides systems and methods for solving each of the stated problems with presently available storage tank leak detection systems.

BRIEF DESCRIPTION OF THE DRAWINGS

Annex A is a printout of the computer program source code referred to herein as the RTU program.

DETAILED DESCRIPTION OF THE PREFERRED EMBODIMENT

Figure 1:
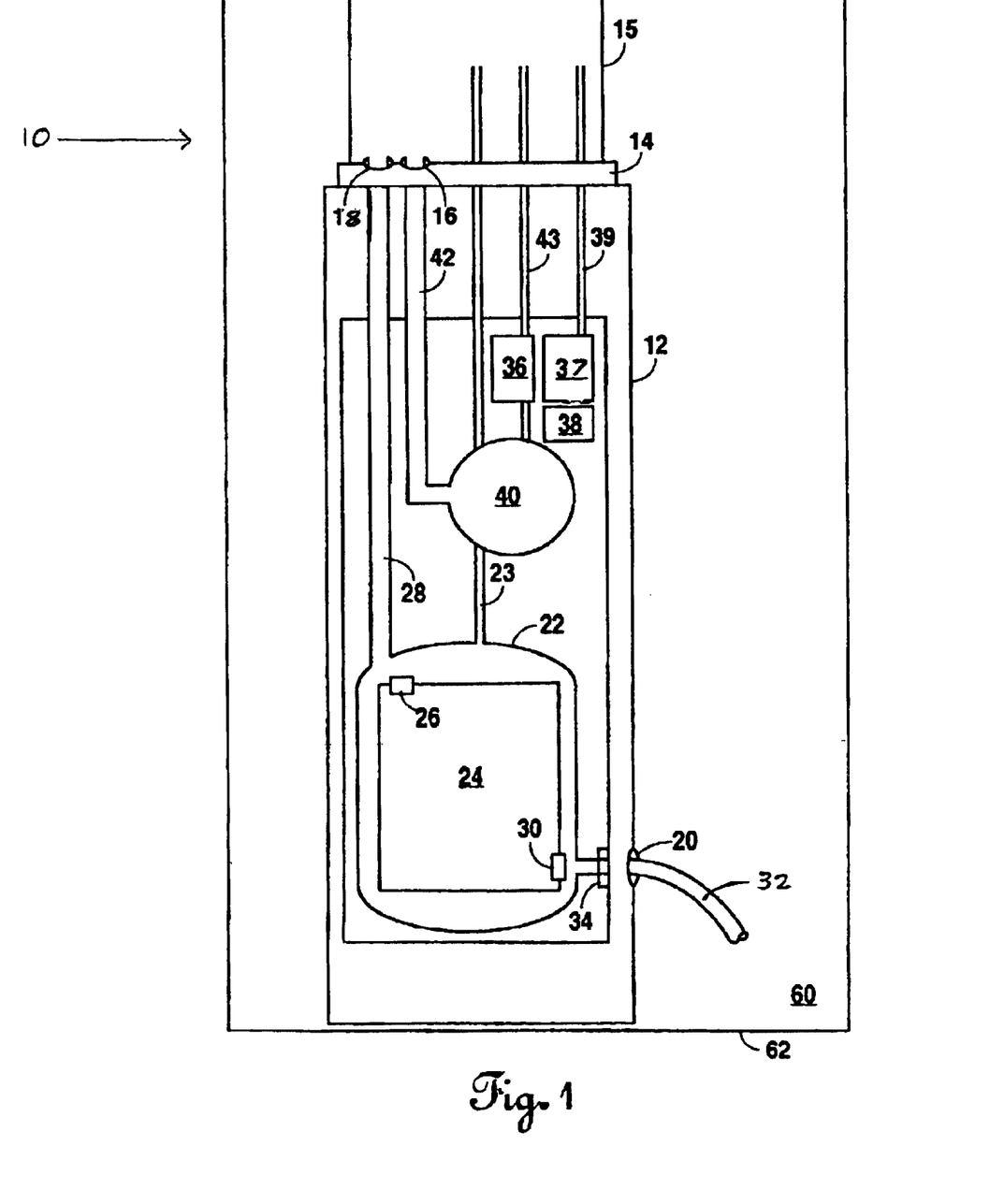
FIG. 1 is a block diagram depicting the general layout of the present leak detection system.

In the drawings and the description that follows, referring to FIG. 1, a preferred embodiment of a storage tank leak detection system according to the present invention is generally designated as system 10. An embodiment of the present invention is shown to include a vacuum-sealed canister 12, which houses and protects a plurality of mass measurement components and system control components. In the preferred embodiment, vacuum-sealed canister 12 is made of a substantially non-corrosive metal (aluminum, for example), however, any material that is corrosion resistant and offers sufficient protection to the components enclosed is adequate for use with the present invention. Canister 12 is directly immersed in storage tank 60 and rests on storage tank bottom surface 62. Canister 12 further contains vacuum seal nozzle 14 and transducer high side aperture 20. Vacuum seal nozzle 14 allows communication means to pass from the inside of the canister to the outside of the canister while maintaining the integrity of the vacuum inside the canister.

Vacuum nozzle 14 further contains barometric pressure measuring means aperture 16 and transducer low side aperture 18.

At its proximate end canister hose 15 forms a fluid tight seal with vacuum seal nozzle 14. Extending from vacuum seal nozzle 14, canister hose 15 passes through storage tank top surface recess 64 to an area outside of the class I region of storage tank 60 (class I region refers to the National Electric Code designated hazardous areas in which only power wattage levels of less than certain prescribed levels may be introduced). Canister hose 15 serves as a conduit for communication means extending though vacuum nozzle 14 and as an atmospheric reference in its service as a barometric pressure measuring means reference hose. Canister hose 15 allows transducer low side aperture 18 and barometric pressure measuring means aperture 16 to be directly exposed to atmospheric pressure while maintaining a fluid tight seal with vacuum seal nozzle 14 thereby preserving the integrity of the vacuum of canister 12.

Figure 2:
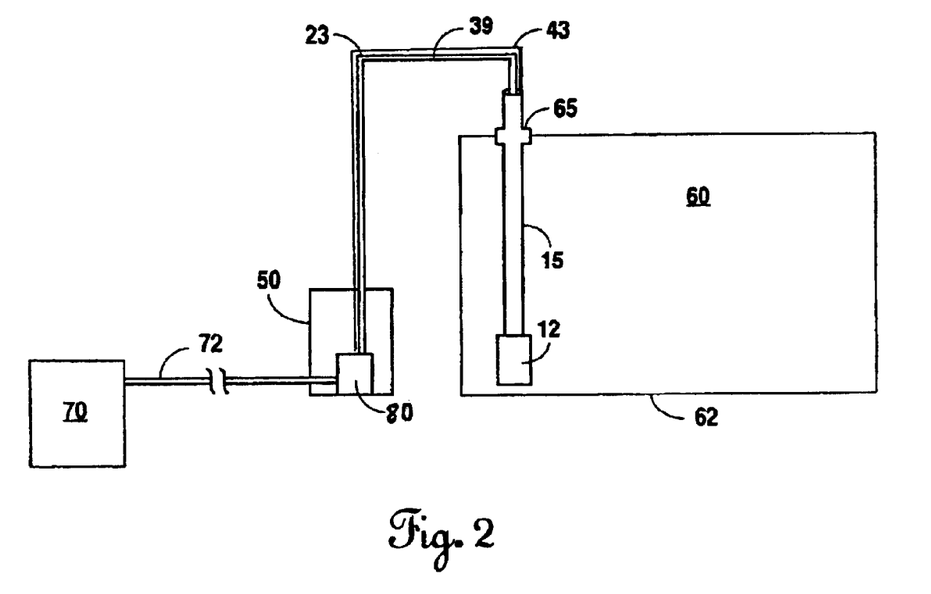
FIG. 2 is an elevational, sagital cross sectional view of the canister ("protective enclosure means") of the leak detection system.

Contained within vacuum-sealed canister 12 is differential pressure transmitter 22. In the preferred embodiment, differential pressure transmitter 22 is comprised of a highly precise quartz crystal type pressure transducer 24. Transducer 24 contains an oscillating quartz crystal and has a resolution of 1×10−8, as known in the industry. Such a unit is available from Paroscientific, Inc. as Model No. 6015-G. The ultimate resolution achievable with a transducer is limited by its noise level. System 10 greatly reduces noise thereby increasing the resolution of transmitter 22. In system 10, transmitter 22 has been modified from its original configuration so that it may be directly immersed in storage tank 60. This modification has eliminated dependence on any bubbler unit (thereby eliminating noise associated with such units) as required by other products. As will be further described in this section, transducer 24 is held at a constant temperature and secured in vacuum to further reduce noise.

Quartz crystal type pressure transducer 24 is further comprised of transducer low side 26. Transducer low side 26 is a differential reference that receives the barometric pressure value at the liquid surface. Transducer low side tube 28 forms an air tight seal at its proximate end with transducer low side 26 and extends though the vacuum of canister 12 where it forms an air tight seal at its distal end at transducer low side aperture 18 of vacuum seal nozzle 14. Transducer low side tube 28 allows transducer low side 26 to receive the barometric pressure from the reference point at the liquid surface while allowing canister 12 to remain in vacuum.

Quartz crystal type pressure transducer 24 is further comprised of transducer high side 30. Quartz crystal type pressure transducer high side 30 is a pressure reference point, which measures the sum of the barometric and hydrostatic pressure at tank bottom surface 62. Transducer high side 30 contains a protruding transducer high side tube 32. In the preferred embodiment, transducer high side tube 32 is filled with a pressure-sensing liquid and extends through transducer high side aperture 20 where it is ported to the product contained in tank 60. Transducer high side tube 32 is surrounded by tube fitting 34. In the preferred embodiment, tube fitting 34 slides along high side tube 32 and forms a fluid tight seal at high side aperture 20. Tube fitting 34 allows high side tube 32 to extend through high side aperture 20 while maintaining the integrity of the vacuum of canister 12.

Transducer 24 subtracts the value received at transducer low side 26 from the value received at transducer high side 30 to arrive at the pressure exerted by the mass of the stored product. Transmitter 22, communicating digitally, then sends this processed information to data logging computer 80. This data is transmitted along data transfer means 23. In the preferred embodiment, data transfer means 23 is a standard bus communications cable. However, one could easily envision a data transfer means such as wireless communication that would work equally as well. Data transfer means 23 extends from the output of differential pressure transmitter 22 through vacuum seal nozzle 14 and continues, separated from storage tank's 60 contents by canister hose 15, to data logging computer 80.

Also contained within canister 12 is current transmitter 37. Current transmitter 37 serves as a part of a temperature regulation scheme used to keep the contents of canister 12 at a constant temperature during the data gathering process. Current transmitter 37, in the preferred embodiment, actuates a resistive heater 36 by a simple on/off control loop. Heat sink 38, acting in combination with current transmitter 37 and resistive heater 36 acts to regulate the temperature of canister 12. While the above temperature regulating scheme has been described with reference to one embodiment, one could easily imagine other temperature regulation schemes that would work equally as well. Data transfer means 39 extends from the output of current transmitter 37 through vacuum seal nozzle 14 and continues, separated from storage tank's 60 contents by canister hose 15, to data logging computer 80. In the preferred embodiment, data transfer means 39 is a standard bus communications cable. However, one could easily envision a data transfer means such as wireless communication that would work equally as well. The use of this temperature regulation scheme to hold transmitter 22 at a constant temperature further increases the precision of the current apparatus. The absolute temperature at which transmitter 22 is maintained is riot critical, rather constancy of temperature affects the integrity of the subject measurements. As a matter of practicality and economy, temperature of transmitter 22 is maintained, according to the presently preferred mode of the present invention, at a temperature of approximately 1° F. above the ambient temperature of the product (oil or gasoline, for example) in tank 60. If, for example, the product is at 50° F., transmitter 22 is maintained at 51° F. if the product is at 90° F., transmitter 22 is maintained at 91° F., and so forth.

Also contained within canister 12 is barometric pressure measuring means 40. Barometric measuring means 40 serves as an independent reference for true atmospheric pressure. In the preferred embodiment, barometric pressure measuring means 40 may be any standard barometer that sends signals to be processed by data logging computer 8 0. Barometric measuring means 40 is very useful for increasing the precision of system 10. All transducers decrease in accuracy over time as they lose their calibration with respect to true atmospheric pressure. This is known as zero drift. However, the present invention employs barometric measuring means 40 to serve as an independent measure of true atmospheric pressure thereby allowing for data correction over any extended period of time. As will be discussed in this section, data correction using values taken from barometric pressure measuring means 40 is software based and greatly increases the precision of the current invention.

Barometric measuring means tube 42 forms an air tight seal at it proximate end with Barometric measuring means 40 and extends though the vacuum of canister 12 where it forms an air tight seal at its distal end at barometric measuring means aperture 16 of vacuum seal nozzle 14. Barometric measuring means tube 42 allows barometric measuring means 40 to receive the barometric pressure from the reference point at the surface of liquid within storage tank 60, while allowing the interior of canister 12 (with transmitter 22 installed therein) to remain in vacuum so as to substantially eliminate any environmentally-effected variations in instrument performance). Data transfer means 43 extends from the output of barometric pressure measuring means 40 through vacuum seal nozzle 14 and continues, separated from storage tank's 60 contents by canister hose 15, to 80. In the preferred embodiment, data transfer means 43 is a standard bus communications cable. However, one could easily envision a data transfer means such as wireless communication that would work equally as well.

Although not necessary, remote computer 80 is typically housed in a separate enclosure, such as field unit 50, as best seen in FIG. 2. In accordance with the described routines to follow and the exemplary computer code depicted in Annex A attached hereto and incorporated herein by reference, data logging computer 80 processes data received from transmitter 22, current transmitter 37, resistive heater 36, heat sink 38, and barometric pressure measuring means 40. Data logging computer 80 communicates with remote computer 70 by data transfer means 72.

The software commences operation with the initialization of data collection at the tank bottom, along with the atmospheric and environmental conditions. Data is automatically collected via computer controlled programming over some length of time, preferably 36 to 60 hours. The length of the test is dependent on tank size and site atmospheric conditions. In the preferred embodiment, data transfer means 72 is a standard bus communications cable. However, one could easily envision a data transfer means such as wireless communication that would work equally as well.

As will be discussed and illustrated hereafter, remote computer 70 contains software that performs linear regressions of data received from data logging computer 80. This regression detects minuscule changes in the mass of the stored product, thereby indicating the presence of the smallest of leaks. As the compilation of data grows, the more precise the regression becomes. The post processing module and software of remote computer 70 is independent of the data logging computer 80.

There are two software programs or modules involved with the storage tank leak detection system of the present invention: The RTU program and the linear regression program. The RTU program is performed by data logging computer 80 and is responsible for obtaining (routine 100) and correcting (routine 200) pressure readings from transmitter 22, controlling the temperature of transmitter 22 (routine 300), calculating adjustments for tank shell expansions (routine 400), obtaining transmitter 22 temperature (routine 500), and data storage. The data acquired by the RTU program is stored within data logging computer 80 in a non-volatile memory 31.

The purpose of the RTU program is to interrogate an intelligent differential pressure transmitter (transmitter 22) via a serial connection. The pressure read from transmitter 22 is the difference in pressure read from transducer low side 26 and transducer high side 30. That pressure value is modified by two additional variables in order to improve the accuracy of the reading. The program performs correction of barometric pressure; an analog barometer (such as barometric pressure measuring means 40) provides the signal that is sent to correct transmitter pressure for errors due to changes in barometric pressure, as measured at the upper surface of the contents of storage tank 60. Also, the program monitors ambient temperature to compensate for changes in the tank diameter which otherwise would skew the data interpretation, intended solely to detect variations of contents of storage tank 60 due to leakage. Any change in tank diameter is accommodated in the calculations of transmitter 22, thus properly attributing substantially all variations in differential pressure (already corrected for variations in atmospheric pressure, as mentioned above) to variations in the content of storage tank 60, such as through leakage.

Figure 3:
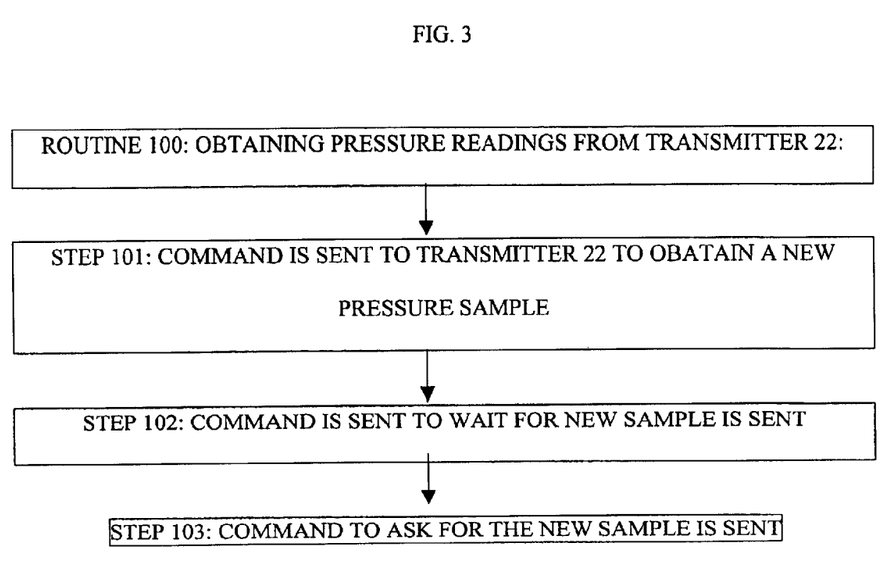
FIG. 3, is a flow chart type view of routine 100 of the present invention, has been added.

Routine 100, obtaining pressure readings from transmitter 22, is performed every one minute as follows: at step 101 a command is sent to transmitter 22 to obtain a new pressure sample, at step 102 a command to wait for the new sample is sent, at step 103 a command to ask for the new sample is sent. The data is returned as an ASCII psi number.

Figure 4:
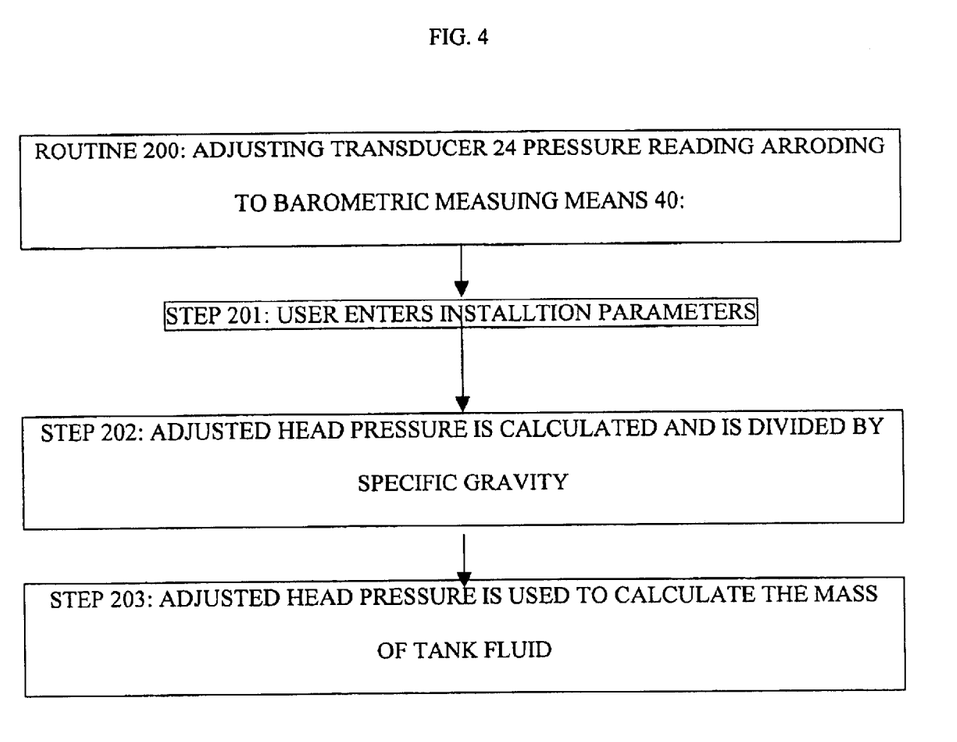
FIG. 4, is a flow chart type view of routine 200 of the present invention, has been added.

Routine 200, adjusting transducer 24 pressure reading according to barometric measuring means 40, is performed as follows: At step 201 the user enters installation parameters reflecting: (1) a predetermined barometric correction factor which is laboratory-determined for each transmitter 22 to establish, and to later enable calibration of the transmitter 22's "zero point"; (2) the coefficient of expansion for storage tank 60 (a factor readily calculated by persons reasonably skilled in the relevant field, applying common materials engineering principles to standards pertaining to storage tank design and materials); (3) the ambient temperature at the installation site at the time installation (for use in calculating dimensional variations in tank 60 according to the aforementioned coefficient of expansion; and (4) the specific gravity of the product contained in storage tank 60. The user will also enter the desired temperature setting for resistive heater 36.

At step 202 the following calculations are undertaken:

$$Hadj = H - Bcf^*(B - 14.5)$$

$$Hadj/sg$$

where (for the present discussion, although not precisely reflected in the same terms in the appended source code) Hadj=adjusted or derived head pressure; H=head pressure in water feet (Hpsi×2.037); Hpsi=head pressure in pounds per square inch (measured at high side 30 of transmitter 22); B=barometer reading in pounds per square inch; sg=specific gravity of the content of tank 60; and Bcf=the barometric correction factor. The number 14.5 is a somewhat arbitrary number which is fairly close to an expected range of actual, measured barometric pressure. This factor is subtracted from measured barometric pressure in order to reduce certain calculated figures to a smaller, and more manageable level for later processing (linear regression, etc.) in tracking minute mass differences in storage tank contents. At step 203 this adjusted or derived pressure data is used to calculate the mass of the product in the tank based on the tank's diameter.

Figure 5:
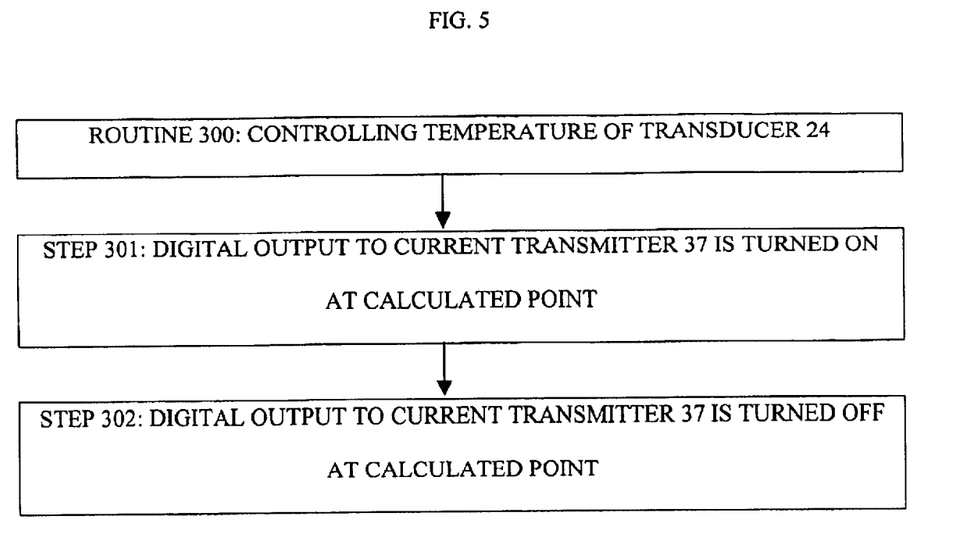
FIG. 5, is a flow chart type view of routine 300 of the present invention, has been added.

Routine 300, controlling transducer 24 temperature, is performed as follows: at step 301 the digital output to current transmitter 37 is turned on when the temperature read from analog input of heat sink 38 is 0.1 degree below the temperature set point, at step 302 the digital output to current transmitter 37 is turned off when the temperature is 0.1 degree above the set point.

Figure 6:
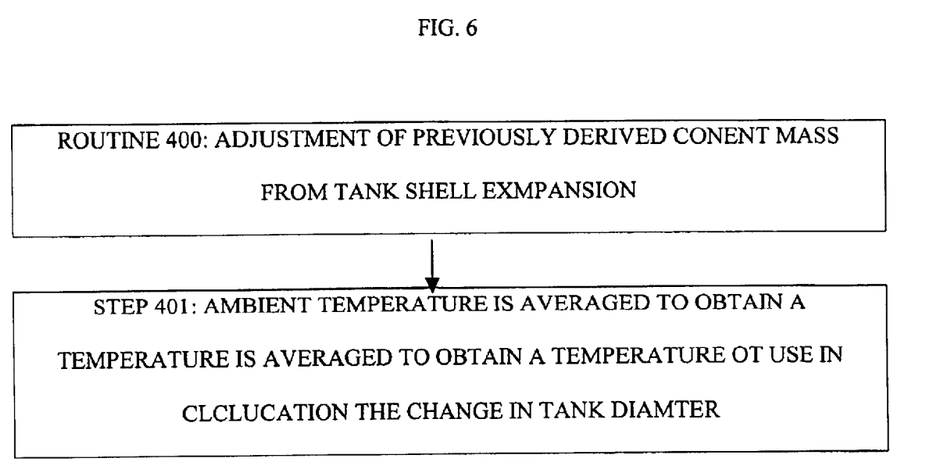
FIG. 6, is a flow chart type view of routine 400 of the present invention, has been added.

Routine 400, adjusting the previously derived content mass for tank shell expansion, is performed as follows: at step 401 the ambient temperature is averaged to obtain a temperature to use in calculating the change in tank diameter, this calculation requires the coefficient of expansion and the tank diameter to be entered by the user either at startup (as mentioned previously) or at any time, the result obtained is used to adjust the total mass in the tank for erroneous, environmentally effected false indications of changes in the content of tank 60, to yield purely leakage related variations (assuming no intension addition or removal of contents by other means).

Figure 7:
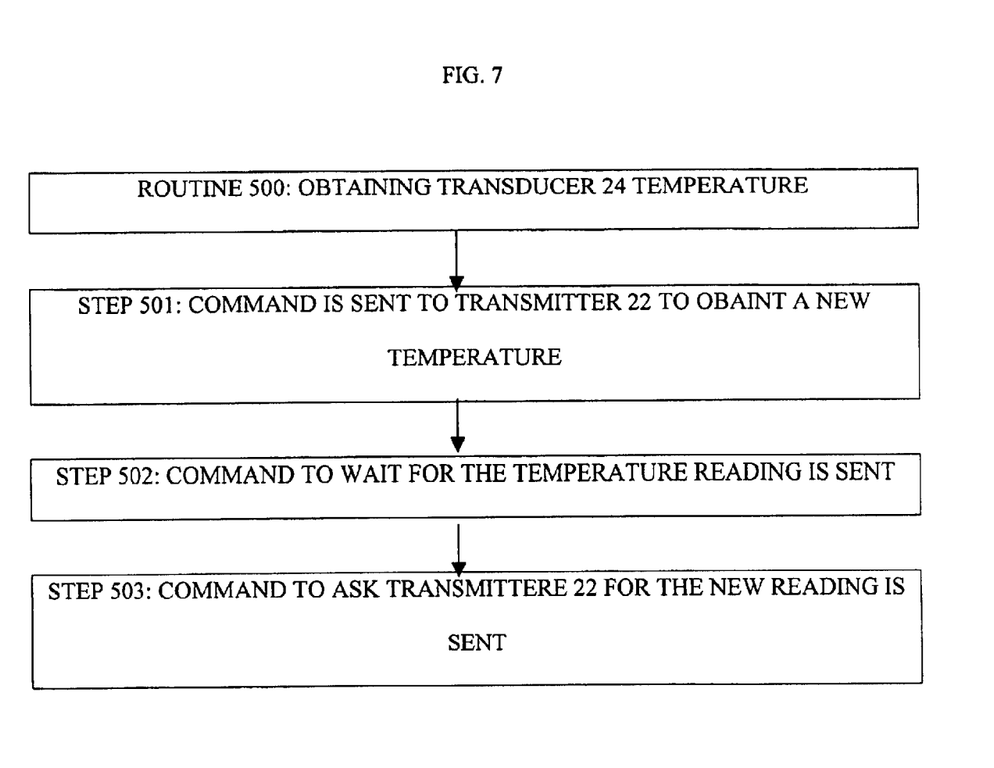
FIG. 7, is a flow chart type view of routine 500 of the present invention, has been added.

Routine 500, obtaining transducer 24 temperature, is performed as follows: at step 501 a command is sent to transmitter 22 to obtain a new temperature, at step 502 a command to wait for the temperature reading is sent, at step 503 a command to ask transmitter 22 for the new reading is sent.

Finally, the RTU program is responsible for data storage. The amount of data storage available will determine how many days of data are stored for retrieval. One record per minute is stored. The organization of the date is by days. The record for every minute will include: (1) the tank contents in pounds (as a floating-point number, IEEE 32 bit format), (2) the barometric pressure (as a ×100–16 bit integer), (3) the ambient temperate (as ×100–16 bit integer). Other data, such as previous transducer temperatures, tank diameter, and tank coefficient of expansion, may also be stored as current data.

Figure 8:
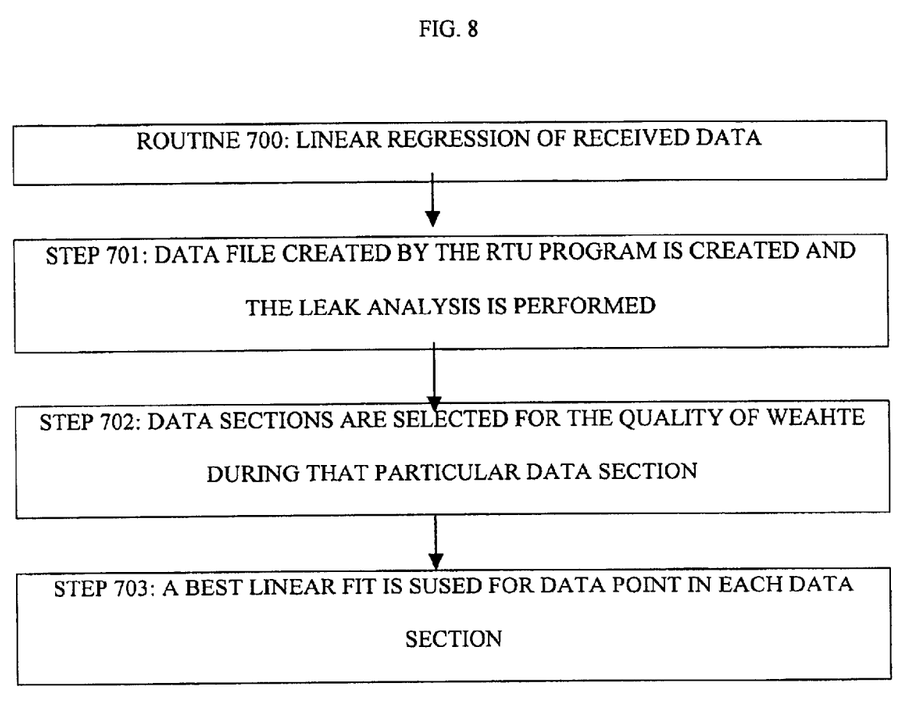
FIG. 8, is a flow chart type view of routine 700 of the present invention, has been added.

The second software program of the storage tank leak detection system of the claimed invention is the linear regression program. Remote computer 70 performs this program. Routine 700, linear regression of received data, is performed as follows: at step 701 the data file created by the RTU program is created and the leak analysis is performed, at step 702 the data sections are selected for the quality of weather during that particular data secton—only nighttime data are typically used in order to minimize extraneous noise in the analysis, at step 703 a best linear fit is used for data points in each data section—when the sections of data that represent durations of appropriately low noise level are included in the best fit data regression, the slope of the best fit line indicates the leak rate. Calculation of the linear regression and best fit are straightforward and could be performed by common software such as Microsoft Excel.

It is believed that, while safe and efficient, the present device will obviate significant inconvenience and provide substantial utility to those who wish to detect leaks in storage tanks. Specifically, the present device will allow very small leaks to be detected in very large storage tanks in a consistent and cost-effective manner.

Although the invention has been described with reference to specific embodiments, this description is not meant to be construed in a limited sense. Various modifications of the disclosed embodiments, as well as alternative embodiments of the inventions will become apparent to person skilled in the art upon the reference to the description of the invention. It is therefore contemplated that the appended claims will cover such modification that fall within the scope of the invention.

We claim:

1. An apparatus for detecting leaks in a liquid storage tank comprising:

differential pressure sensor means having a low pressure measurement component and a high pressure measurement component;

protective enclosure means for protecting said differential pressure sensor means from materials and conditions when immersed in liquid contents of said storage tank;

said high pressure measurement component being configured for measuring tank bottom pressure within a liquid in which said protective enclosure means is immersed;

said low pressure measurement component being configured for receiving data indicative of atmospheric pressure substantially at the surface of said liquid;

barometric pressure measuring means configured for measuring atmospheric pressure substantially at the surface of said liquid when said protective enclosure means is immersed therein;

barometric pressure and differential pressure calculation means configured for receiving first and second data reflecting, respectively, said tank bottom pressure and of said barometric pressure substantially at said surface of said liquid, and for adjusting said first data to substantially eliminate variations upon said measurements of said tank bottom pressure caused solely from atmospheric pressure variations to yield an atmospheric pressure adjusted tank bottom pressure;

ambient temperature measurement means for measuring ambient temperature near said storage tank;

tank dynamic and barometric pressure adjusted tank bottom pressure calculation means configured for receiving third data indicative of said atmospheric pressure adjusted tank bottom pressure, for receiving fourth data indicative of ambient temperature measurements by said ambient temperature measurement means, for receiving fifth data indicative of expansion characteristics of said storage tank, and for adjusting said third data with reference to said fourth and fifth data to substantially eliminate variations upon measurements and calculations of said barometric pressure adjusted tank bottom pressure, caused solely by dimensional changes in said storage tank resulting from atmospheric temperature variations, to yield a tank dynamic adjusted tank bottom pressure; and tank content mass calculation means for calculating mass contents of said storage tank substantially based on said tank dynamic adjusted tank bottom pressure and user input data reflecting physical characteristics of said contents of said storage tank.

2. The apparatus of claim 1 wherein said protective enclosure means is configured for maintaining at least some components of said apparatus, including said differential pressure sensor, but excepting said low pressure measurement component and said high pressure measurement component, in a substantial vacuum.

3. The apparatus of claim 2 further comprising protective enclosure temperature management means configured for maintaining the temperature of said protective enclosure substantially at a user-specified temperature.

4. The apparatus of claim 1 further comprising protective enclosure temperature management means configured for maintaining the temperature of said protective enclosure substantially at a user-specified temperature.

5. An, apparatus for detecting leaks in a liquid storage tank comprising:

differential pressure sensor means having a low pressure measurement component and a high pressure measurement component;

protective enclosure means for protecting said differential pressure sensor means from materials and conditions when immersed in liquid contents of said storage tank;

said high pressure measurement component being configured for measuring tank bottom pressure within a liquid in which said differential pressure sensor means is immersed;

said low pressure measurement component being configured for receiving data indicative of atmospheric pressure substantially at the surface of said liquid;

first barometric pressure measuring means configured for measuring atmospheric pressure substantially at the surface of said liquid when said protective enclosure means is immersed therein and for communicating such measurement to said low pressure measurement component of said differential pressure sensor means;

second barometric pressure measuring means configured for measuring atmospheric pressure substantially at the surface of said liquid when said protective enclosure means is immersed therein;

barometric pressure and differential pressure calculation means configured for receiving first and second data reflecting, respectively, said tank bottom pressure and of said barometric pressure as measured by said first barometric pressure measuring means and for calculating pressure attributable to liquid content of said storage tank, and receiving third data from said second barometric measuring means and, based thereon, adjusting said pressure attributable to said contents of said storage tank to substantially eliminate variations upon said measurements thereof caused solely from atmospheric pressure variations to yield an atmospheric pressure adjusted tank bottom pressure;

ambient temperature measurement means for measuring ambient temperature near said storage tank;

tank dynamic and barometric pressure adjusted tank bottom pressure calculation means configured for receiving fourth data indicative of said atmospheric pressure adjusted tank bottom pressure, for receiving fifth data indicative of ambient temperature measurements by said ambient temperature measurement means, for receiving sixth data indicative of expansion characteristics of said storage tank, and for adjusting said fourth data with reference to said fifth and sixth data to substantially eliminate variations upon measurements and calculations of said barometric pressure adjusted tank bottom pressure, caused solely by dimensional changes in said storage tank resulting from atmospheric temperature variations, to yield a tank dynamic adjusted tank bottom pressure; and tank content mass calculation means for calculating mass contents of said storage tank substantially based on said tank dynamic adjusted tank bottom pressure and user input data reflecting physical characteristics of said contents of said storage tank.

6. The apparatus of claim 5 wherein said protective enclosure means is configured for maintaining at least some components of said apparatus, including said differential pressure sensor means, but excepting said low pressure measurement component and said high pressure measurement component, in a substantial vacuum.

7. The apparatus of claim 6 further comprising protective enclosure temperature management means configured for maintaining the temperature of said protective enclosure substantially at a user-specified temperature.

8. The apparatus of claim 5 further comprising protective enclosure temperature management means configured for maintaining the temperature of said protective enclosure substantially at a user-specified temperature.

9. A method for detecting leaks in a storage tank; comprising the steps of:

selecting a mass detection system comprising:
differential pressure sensor means having a low pressure measurement component and a high pressure measurement component;
protective enclosure means for protecting said differential pressure sensor means from materials and conditions when immersed in liquid contents of said storage tank;
said high pressure measurement component being configured for tank bottom pressure within a liquid in which said differential pressure sensor means is immersed;
said low pressure measurement component being configured for receiving data indicative of atmospheric pressure substantially at the surface of said liquid;
barometric pressure measuring means configured for measuring atmospheric pressure substantially at the surface of said liquid when said protective enclosure means is immersed therein;
barometric pressure and differential pressure calculation means configured for receiving first and second data reflecting, respectively, tank bottom pressure and of said barometric pressure substantially at said surface of said liquid, and for adjusting said first data to substantially eliminate variations upon said measurements of said tank bottom pressure caused solely from atmospheric pressure variations to yield an atmospheric pressure adjusted tank bottom pressure;
ambient temperature measurement means for measuring ambient temperature near said storage tank;
tank dynamic and barometric pressure adjusted tank bottom pressure calculation means configured for receiving third data indicative of said atmospheric pressure adjusted tank bottom pressure, for receiving fourth data indicative of ambient temperature measurements by said ambient temperature measurement means, for receiving fifth data indicative of expansion characteristics of said storage tank, and for adjusting said third data with reference to said fourth and fifth data to substantially eliminate variations upon measurements and calculations of said barometric pressure adjusted tank bottom pressure, caused solely by dimensional changes in said storage tank resulting from atmospheric temperature variations, to yield a tank dynamic adjusted tank bottom pressure; and
tank content mass calculation means for calculating mass content data representative of the contents of said storage tank substantially based on said tank dynamic adjusted tank bottom pressure and user input data reflecting physical characteristics of said contents of said storage tank;

selecting data storage means for collecting a plurality of mass content data as generated by said tank content mass calculation means over a plurality of points in time;

selecting computing means configured for generating a human perceptible indicating of changes in said mass content data between a plurality of said points in time;

placing said protective enclosure means substantially at a bottom interior surface of said storage tank;

actuating said mass detection system; and observing data indicative of changes in said mass content data attributable to leakage of said storage tank to detect of such leakage.

10. The method of claim 9 further comprising the steps of:

securing all input and outflow orifices of said storage tank before said actuation of said mass detection system; and substantially selectively processing said mass content data which were generated approximately between sunset and sunrise at an installation site of said system.

11. The method of claim 10 wherein said protective enclosure means is configured for maintaining at least some components of said system, including said differential pressure sensor means, but excepting said low pressure measurement component and said high pressure measurement component, in a substantial vacuum.

12. The method of claim 11 further comprising protective enclosure temperature management means configured for maintaining the temperature of said protective enclosure substantially at a user-specified temperature.

13. The method of claim 9 wherein said protective enclosure means is configured for maintaining at least some components of said system, including said differential pressure sensor means, but excepting said low pressure measurement component and said high pressure measurement component, in a substantial vacuum.

14. The method of claim 11 further comprising protective enclosure temperature management means configured for maintaining the temperature of said protective enclosure substantially at a user-specified temperature.

15. The method of claim 9 further comprising protective enclosure temperature management means configured for maintaining the temperature of said protective enclosure substantially at a user-specified temperature.

16. A method for detecting leaks in a storage tank; comprising the steps of selecting a mass detection system comprising:

differential pressure sensor means having a low pressure measurement component and a high pressure measurement component;

protective enclosure means for protecting said differential pressure sensor means from materials and conditions when immersed in liquid contents of said storage tank;

said high pressure measurement component being configured for measuring tank bottom pressure within a liquid in which said differential pressure sensor means is immersed;

said low pressure measurement component being configured for receiving data indicative of atmospheric pressure substantially at the surface of said liquid;

first barometric pressure measuring means configured for measuring atmospheric pressure substantially at the surface of said liquid when said protective enclosure means is immersed therein and for communicating such measurement to said low pressure measurement component of said differential pressure sensor means;

second barometric pressure measuring means configured for measuring atmospheric pressure substantially at the surface of said liquid when said protective enclosure means is immersed therein;

barometric pressure and differential pressure calculation means configured for receiving first and second data reflecting, respectively, said tank bottom pressure and of said barometric pressure as measured by said first barometric pressure measuring means and for calculating pressure attributable to liquid content of said storage tank, and receiving third data from said second barometric measuring means and, based thereon, adjusting said pressure attributable to said contents of said storage tank to substantially eliminate variations upon said measurements thereof caused solely from atmospheric pressure variations to yield an atmospheric pressure adjusted tank bottom pressure;

ambient temperature measurement means for measuring ambient temperature near said storage tank;

tank dynamic and barometric pressure adjusted tank bottom pressure calculation means configured for receiving fourth data indicative of said atmospheric pressure adjusted tank bottom pressure, for receiving fifth data indicative of ambient temperature measurements by said ambient temperature measurement means, for receiving sixth data indicative of expansion characteristics of said storage tank, and for adjusting said fourth data with reference to said fifth and sixth data to substantially eliminate variations upon measurements and calculations of said barometric pressure adjusted tank bottom pressure, caused solely by dimensional changes in said storage tank resulting from atmospheric temperature variations, to yield a tank dynamic adjusted tank bottom pressure; and tank content mass calculation means for calculating mass contents of said storage tank substantially based on said tank dynamic adjusted tank bottom pressure and user input data reflecting physical characteristics of said contents of said storage tank;

selecting data storage means for collecting a plurality of mass content data as generated by said tank content mass calculation means over a plurality of points in time;

selecting computing means configured for generating a human perceptible indicating of changes in said mass content data between a plurality of said points in time;

placing said protective enclosure means substantially at a bottom interior surface of said storage tank;

actuating said mass detection system; and observing data indicative of changes in said mass content data attributable to leakage of said storage tank to detect of such leakage.

17. The method of claim 16 further comprising the steps of:

securing all input and outflow orifices of said storage tank before said actuation of said mass detection system; and substantially selectively processing said mass content data which were generated approximately between sunset and sunrise at an installation site of said system.

18. The method of claim 17 wherein said protective enclosure means is configured for maintaining at least some components of said system, including said differential pressure sensor means, but excepting said low pressure measurement component and said high pressure measurement component, in a substantial vacuum.

19. The method of claim 17 further comprising protective enclosure temperature management means configured for maintaining the temperature of said protective enclosure substantially at a user-specified temperature.

20. The method of claim 16 wherein said protective enclosure means is configured for maintaining at least some components of said system within said canister, including said differential pressure sensor means, but excepting said low pressure measurement component and said high pressure measurement component, in a substantial vacuum.

21. The method of claim 20 further comprising protective enclosure temperature management means configured for maintaining the temperature of said protective enclosure substantially at a user-specified temperature.

22. The method of claim 16 further comprising protective enclosure temperature management means configured for maintaining the temperature of said protective enclosure substantially at a user-specified temperature.

* * * * *